No. 868,243. PATENTED OCT. 15, 1907.
D. APSTEIN.
PUNCTURE CLOSER.
APPLICATION FILED MAR. 11, 1907.
*Fig. 1.*
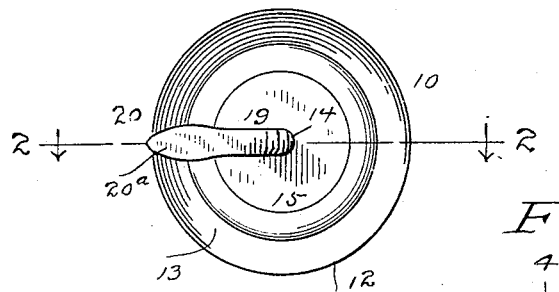
*Fig. 2.*
*Fig. 3.*
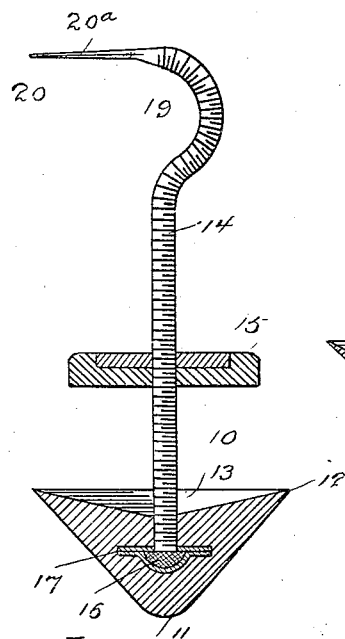
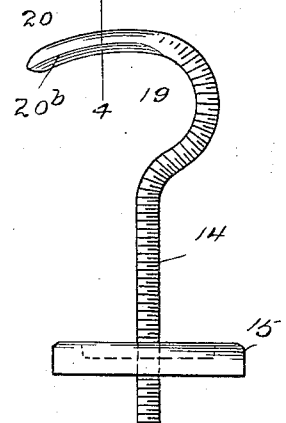
*Fig. 4.*
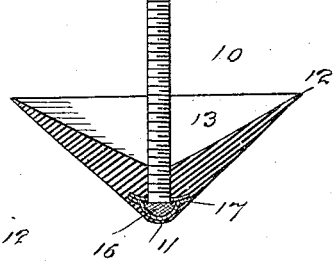
*Fig. 5.*
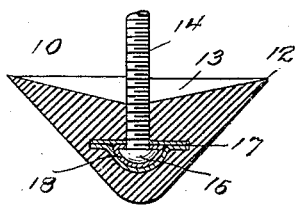
WITNESSES
H. A. Lamb.
S. W. Atherton.
INVENTOR
David Apstein
BY
A. M. Wooster
ATTORNEY

UNITED STATES PATENT OFFICE.

DAVID APSTEIN, OF BRIDGEPORT, CONNECTICUT.

PUNCTURE-CLOSER.

No. 868,243.  Specification of Letters Patent.  Patented Oct. 15, 1907.

Application filed March 11, 1907. Serial No. 361,844.

*To all whom it may concern:*

Be it known that I, DAVID APSTEIN, a citizen of the United States, residing at Bridgeport, county of Fairfield, State of Connecticut, have invented a new and useful Puncture-Closer, of which the following is a specification.

This invention has for its object to provide a simple, easily and quickly operated and inexpensive combined puncture closer and operating tool therefor.

With this end in view the invention comprises a flexible closer, a threaded shank by which the closer is carried, a nut on the shank for retaining the closer in place, a hand piece on the shank for rotating the shank in setting the closer to place on the inner side of a tire and a cutter on the shank for enlarging a puncture in a tire to permit the insertion of the closer.

In the accompanying drawing forming a part of this specification, Figure 1 is a plan view of my novel closer; Fig. 2 a section of the nut and closer on the line 2—2 in Fig. 1, the shank and cutter being in elevation; Fig. 3 a similar view showing a slightly variant form of cutter; Fig. 4 a detail section on an enlarged scale on the line 4—4 in Fig. 3; and Fig. 5 is a sectional view illustrating a form in which the shank is adapted to be rotated independently of the closer.

10 denotes the closer which is made of soft rubber and has the general configuration of a cone with a rounded point indicated by 11 and a thin edge indicated by 12. The base of the closer is preferably hollowed out more or less as at 13, rendering the edges thinner and more flexible and adapting the closer to shape itself readily to the concave inner face of a pnuematic tire when drawn to place.

14 denotes a shank which is threaded to receive a nut 15 which may or may not be padded. At the inner end of the shank is a head 16. The closer may be rigidly secured to the shank as in Figs. 3 and 4, or the closer may be rotatably attached to the shank as in Fig. 5, as preferred. In the form illustrated in Figs. 2 and 3, the closer is molded upon the head. In order to secure the closer firmly upon the shank and prevent the possibility of the shank being pulled out, I preferably roughen head 16 and place patches 17 of textile material on opposite sides thereof, the shank being passed through the patch on the inner side of the head. These patches are secured to each other and to the roughened head by cement, and when the patches and head are molded into the closer it is made practically impossible for the closer to become loose on the shank or for the shank to be pulled out of the closer.

In the form illustrated in Fig. 5, the head is loosely inclosed in a metallic cap indicated by 18. Patches 17 are placed on opposite sides of the cap and the cap and patches are molded into the head, leaving the cap and closer, however, independent of the shank and head so that the shank and head may be rotated independently of the cap and closer.

Heretofore puncture closers of this general character have required the use of tools to enlarge the opening in the tire to permit the insertion of the closer, to insert the closer in place and to lock it there.

The object of my present invention is to provide a puncture closer that shall provide in its own structure means for enlarging the opening in the tire, means for inserting it in place in the tire, means for holding it and means for securing it in place without the use of any other tools whatever, so that the use of a kit of tools may be dispensed with and punctures may be quickly and effectually closed by any person without skill in the use of tools and without the necessity for carrying tools. The shank itself serves as an inserting and holding tool. It is obvious, however, that in locking the closer to place the shank or nut must be rotated relatively to each other. I therefore bend the end of the shank opposite to the closer to a shape to form a suitable hand piece indicated by 19. This hand piece is formed by curving the shank laterally and recurving it upward and over past the line of the shank something in the form of a sickle so as to form a hand piece that may be conveniently grasped by the hand and which shall be of convenient shape to impart axial rotation to the shank. At the outer end of the hand piece—that is, on the portion extending beyond the line of the shank—I form a cutter indicated by 20, with which to enlarge an aperture in the tire sufficiently to permit the insertion of the closer. This aperture may be formed by enlarging the puncture longitudinally by means of the cutter making a slit in the tire or by inserting the end of the cutter in the aperture and rotating it therein, thus enlarging the aperture.

The special formation of the cutter is immaterial so far as the principle of the invention is concerned. The cutter may be formed by flattening the end of the hand piece on opposite sides and forming thereon a spear point, as in Figs. 1 and 2, in which the cutter is specifically indicated by $20^a$, or, if preferred, the cutter may be formed as in Figs. 3 and 4 by flattening the underside of the hand piece, forming planes which meet at an angle on the underside of the cutter, the end of the handle being left pointed to permit convenient insertion into an aperture. This form of cutter is specifically indicated by $20^b$ in Figs. 3 and 4.

The operation is as follows: In repairing a tire, the puncture is enlarged sufficiently by means of the cutter to permit the insertion of the closer. The nut is withdrawn on the shank and the closer is forced through the puncture and into the tire, the base of the closer being preferably covered with cement so as to cause it to adhere to the inner face of the tire. The closer is then drawn tightly against the tire and the nut turned down to place on the shank. After turning the nut down as far as possible, the nut is held and the shank is rotated by means of the hand piece, it being immaterial so far as the principle of the invention is concerned whether the closer is rotated with the shank, as in Figs. 2 and 3, or whether the shank is free to rotate independently of the closer as in Fig. 5. After the closer and nut are set to place, clamping the tire firmly between them, the portion of the shank outside of the nut is cut or broken off flush with the outer face of the nut which will project but slightly above the outer face of the tire.

Having thus described my invention, I claim:

1. A combined puncture closer and operating tool comprising a threaded shank, a flexible closer carried thereby, a nut for retaining the closer in place, a hand piece on the shank for rotating the shank in setting the closer to place and a cutter on the end of the shank formed by flattening the end of the hand piece horizontally and forming thereon a horizontal spear point, substantially as described, for the purpose specified.

2. A combined puncture closer and operating tool comprising a threaded shank having a head formed thereon, a metal cap loosely engaging the head, textile patches on opposite sides of the cap, a flexible closer molded about said cap and patches, a nut for retaining the closer in place, a hand piece on the shank for rotating the shank in setting the closer to place and a cutter on the end of the shank for enlarging a puncture in a tire to permit the insertion of the closer.

3. A combined puncture closer and operating tool comprising a threaded shank, a flexible closer carried thereby, a nut for retaining the closer in place, a hand piece formed laterally and re-curved upward and over past the line of the shank, for the purpose set forth, and a cutter on the end of the shank for enlarging a puncture.

In testimony whereof I affix my signature, in presence of two witnesses.

DAVID APSTEIN.

Witnesses:
A. M. WOOSTER,
S. W. ATHERTON.